US005534921A

United States Patent [19]
Sawanobori

[11] Patent Number: 5,534,921
[45] Date of Patent: Jul. 9, 1996

[54] CCD DIGITAL CAMERA SYSTEM WITH SELECTABLE MEMORIES

[75] Inventor: Keiji Sawanobori, Tokyo, Japan

[73] Assignee: Asahi Kogaku Kogyo Kabushiki Kaisha, Tokyo, Japan

[21] Appl. No.: 311,357

[22] Filed: Sep. 23, 1994

[30] Foreign Application Priority Data

Sep. 24, 1993 [JP] Japan .................... 5-258971

[51] Int. Cl.$^6$ ............ H04N 5/222; H04N 5/225
[52] U.S. Cl. .................... 348/333; 348/231
[58] Field of Search ............ 348/333, 207, 348/341, 335, 231; 358/335; H04N 5/222, 5/225

[56] References Cited

U.S. PATENT DOCUMENTS

| | | | |
|---|---|---|---|
| 4,814,876 | 3/1989 | Horio et al. | 348/333 |
| 4,837,817 | 6/1989 | Maemori | 348/333 |
| 4,876,590 | 10/1989 | Parulski | 348/333 |
| 4,887,161 | 12/1989 | Watanabe et al. | 348/333 |
| 5,067,029 | 11/1991 | Takahashi | 358/335 |
| 5,164,833 | 11/1992 | Aoki | 348/333 |

*Primary Examiner*—Wendy R. Greening
*Assistant Examiner*—Tuan V. Ho
*Attorney, Agent, or Firm*—Greenblum & Bernstein

[57] ABSTRACT

A CCD digital camera system has a digital camera and a detachable display device. The digital camera includes an imaging device for receiving an image of an object to be photographed, the imaging device outputting a digital signal corresponding to the received image. The digital camera also includes a data memory for storing a portion of the digital signal and a controller for controlling a transfer of a first portion of the digital signal from the imaging device to the memory. The display device has an image memory for storing image data and a display for displaying an image corresponding to the image data stored in the image memory. The controller monitors one of its inputs for a predetermined signal, the predetermined signal indicating whether the display device is attached to the digital camera. If a presence of the predetermined signal is detected, the controller transfers all of the digital signal to the image memory.

16 Claims, 6 Drawing Sheets

CCD DIGITAL CAMERA SYSTEM WITH SELECTABLE MEMORIES

BACKGROUND OF THE INVENTION

The present invention relates to a camera system, having a camera that can record an image of an object to be photographed using a CCD (Charge Coupled Device) and a display device for displaying the photographed image.

Recently, digital cameras which electronically store data related to a photographed image have become popular. The digital camera converts an optical image to electronic image data and digitally records the image data on a recording medium, such as an IC card. When the image is reproduced, the recorded digital data is retrieved from the storage medium and displayed on a display device or printed out as a hard copy image.

Generally, a CCD receives the optical image and outputs an electrical signal corresponding to the optical image. The electrical signal is A/D converted, and then stored on a recording medium, such as a floppy disk or an IC memory card. The CCD is constructed such that photoelectric elements, such as photodiodes which convert the intensity of light into an electric charge, are arranged in a matrix. The electric charge generated in each element is transferred in vertical and horizontal directions. Thus, the image data for one picture frame, which is obtained by exposing the CCD to an object image, is outputted as a series of data and transferred by horizontal and vertical CCD shift registers HCCD and VCCD, respectively, and recorded onto the recording medium.

In this type of camera, since the size of the image data outputted by the CCD is large, if the image data is recorded as is, the recording medium can store only a small number of pictures. Therefore, the image data obtained by the CCD is compressed before it is recorded. When reproducing the image, the compressed data is read out and expanded.

If the camera uses the above described system, since the compression takes a certain period of time, the data outputted by the CCD should first be stored unmodified, in a data storage memory (a field memory or a frame memory). Then, the stored data is compressed. With this construction, a large capacity data storage memory is required, since a large amount of data must be compressed. However, a large capacity memory is physically large, resulting in the overall size of the camera being large. Further, a large capacity memory is expensive, thereby increasing the cost of manufacturing the camera.

Further, in this type of camera, it is desirable that the camera display the picture immediately after photographing the object. In order to display the photographed image, the image data is stored in an image memory, and then, the stored image data is used to drive a display device. However, in this system, the image memory is used only for storing the image data that is used for driving the display device. Therefore, in order to store data on a recording medium, as well as display data on a display device, the camera must be provided with a data storage memory and an image memory. However, both memories are large capacity memories and are therefore physically large and expensive, thereby increasing the size of the camera and its manufacturing cost.

SUMMARY OF THE INVENTION

It is, therefore, an object of the present invention to provide an improved CCD digital camera system having a digital camera and a detachable display device, in which when the display device is attached thereto, utilizes the image memory of the display device to store image data that will be processed for storage on a recording medium.

Another object of the present invention is to be able to determine whether the display device is attached thereto, and to store the image data in either an image memory of the display device or an internal memory of the digital camera, depending on the determination made.

According to one aspect of the present invention, there is provided a CCD digital camera system which includes a digital camera and a detachable display device. The digital camera includes:

an imaging device for receiving an image of an object to be photographed, the imaging device outputting a digital signal corresponding to the received image;

a data memory for storing a portion of the digital signal; and a controller for controlling a transfer of a first portion of the digital signal from the imaging device to the memory. The display device includes:

an image memory for storing image data; and a display for displaying an image corresponding to the image data stored in the image memory.

The controller monitors an input thereto for a predetermined signal. The predetermined signal indicates whether the display device is attached to the digital camera. If a presence of the predetermined signal is detected, the controller transfers all of the digital signal to the image memory.

According to another aspect of the present invention, there is provided a method of storing an image of an object photographed using a CCD digital camera system, which includes a digital camera and a detachable display device. The method includes the steps of:

converting an optical image of an object to be photographed, into a digital signal;

detecting a presence of a predetermined signal, the predetermined signal being present if the display device is attached to the digital camera; and storing the digital signal in an image memory contained within the display device, if a presence of the predetermined signal is detected.

According to a further aspect of the present invention, there is provided a CCD digital camera system which includes a digital camera and a detachable display device. The display device includes:

an image memory for storing image data; and a display for displaying an image corresponding to the image data stored in the image memory. The digital camera includes:

an imaging device for receiving an image of an object to be photographed, the imaging device outputting a digital signal corresponding to the received image; and a controller.

The controller monitors an input thereto for a predetermined signal. The predetermined signal indicates whether the display device is attached to the digital camera. If a presence of the predetermined signal is detected, the controller stores the digital signal in the image memory of the display device.

DESCRIPTION OF THE EMBODIMENTS

Figure 1:
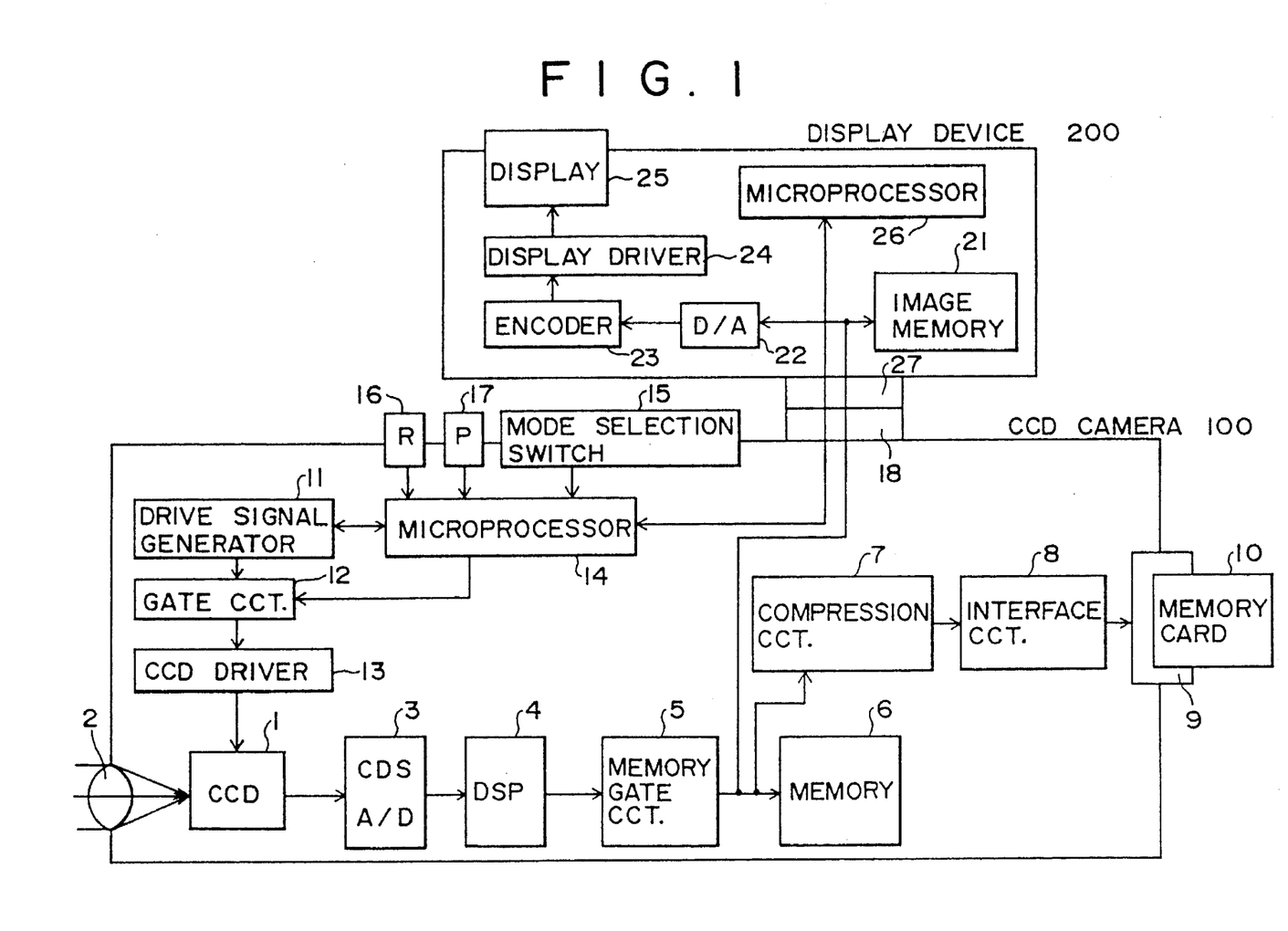
FIG. 1 is a block diagram of a CCD digital camera system which embodies the present invention.

FIG. 1 is a block diagram of a CCD digital camera system embodying the present invention.

The camera system includes a CCD digital camera 100 and a display device 200 which is detachably coupled to the CCD digital camera 100.

The CCD digital camera 100 has a CCD 1 which has 380,000 photodiodes arranged in a matrix. An image of an object to be photographed is formed on a light receiving surface of the CCD 1 by an optical system 2. The CCD 1 then outputs image data corresponding to the image of the object. First, reset noise included in the image data is decreased or eliminated, and then, the image data is converted into digital image data in a CDS-A/D (correlation double sampling-analog/digital) converter 3. The digital image data is then transmitted to a DSP (digital signal processor) 4. In the DSP 4, the digital image data is formatted as a predetermined data signal. A memory gate circuit 5 allows the formatted data signal to be transmitted to a memory 6 at a predetermined timing. The size of the memory 6 is relatively small with respect to the entire data to be recorded. Further, the size of memory 6 is determined so that it can store the minimum amount of data that is required by a compression circuit 7. This minimum amount of data is then transmitted to the compression circuit 7 and compressed. The compressed data is then recorded onto a memory card 10, which is connected to a connector 9, through an interface 8.

The camera 100 has a drive signal generator 11 for outputting a drive signal to be used for transferring the image data generated by the CCD 1. A gate circuit 12 controls the timing of the drive signal. The drive signal is inputted to a CCD driver 13. The CCD driver 13 drives the CCD 1, in accordance with the drive signal, to output image data sequentially to the CDS-A/D circuit 3.

The operation is controlled by a microprocessor 14. States of a mode selection switch 15, a recording switch 16 and a play (reproducing) switch 17, are inputted to the microprocessor 14. The compression ratio of the image data is selected using the mode selection switch 15. When the recording switch 16 is depressed, the CCD 1 outputs the image data, which is then processed and recorded on the recording medium, as described above.

If the play switch 17 is depressed, the photographed image is displayed on a display device 200.

The display device 200 has an image memory 21 which stores image data corresponding to the image to be displayed. The stored image data is converted into analog image data using a D/A converter 22, and then transmitted to an encoder 23, and a display driver 24. The display driver 24 drives a display element 25, the display driver being controlled by a microprocessor 26. In this embodiment, an LCD (liquid crystal display), or a TFT (thin film transistor) is used as the display element 25.

When the display device 200 is coupled to the camera 100, a connector 18 of the camera 100 and a connector 27 of the display device 200 are connected, allowing data to be transferred from microprocessor 14 of the camera 100 to the microprocessor 26 of the display device. This permits the exchange of control signals and image data between the camera 100 and the display device 200. Further, when the connectors 18 and 27 are connected, the image memory 21 is connected to the compression/expansion unit 7 of the camera 100. In this embodiment, as shown in FIG. 1, data can be transferred from the output of the memory gate circuit 5, to the image memory 21, and then transferred from the image memory 21 to the compression/expansion circuit 7. The image memory 21 is a frame memory which can store image data corresponding to one frame of the image to be displayed.

Figure 2:
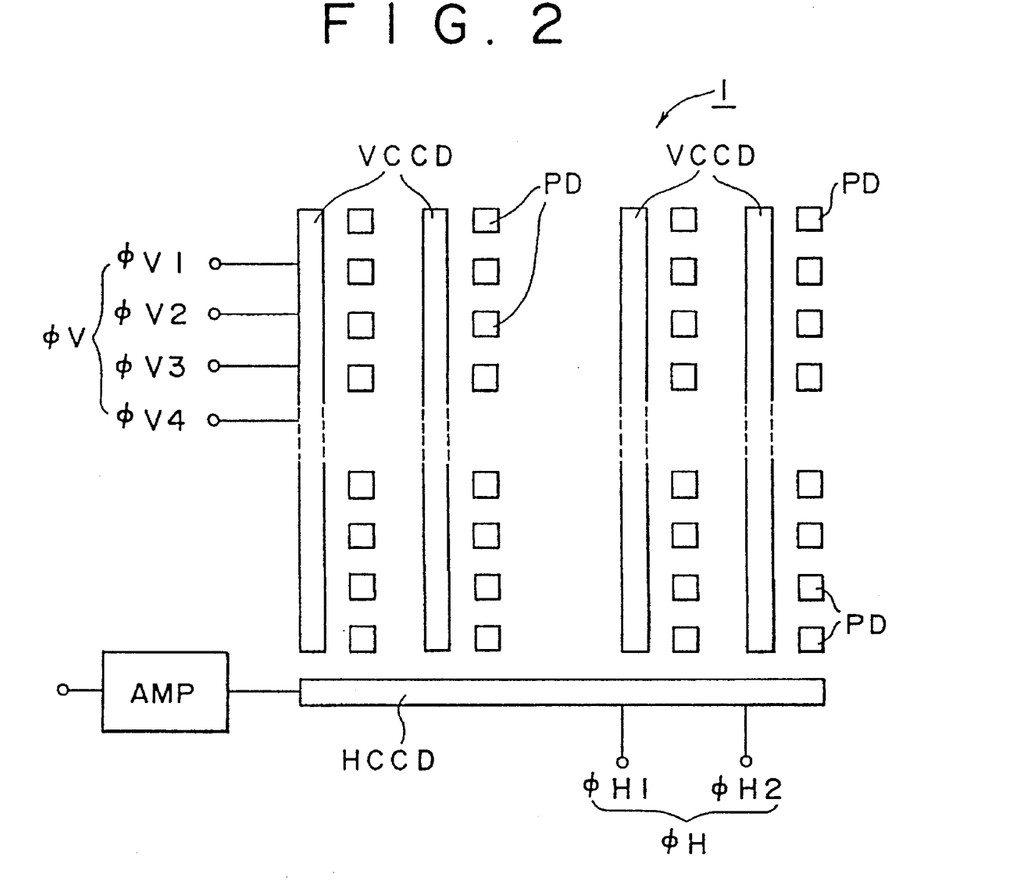
FIG. 2 shows a schematic of the construction of the CCD shown in FIG. 1.

FIG. 2 shows a schematic construction of the CCD 1. As described above, there are 380,000 photodiodes PD arranged in a matrix. In the matrix shown in FIG. 2, vertical transfer shift registers VCCD extend in a column direction as shown in FIG. 2. Further, on one side of the vertical transfer CCD shift registers VCCD, a horizontal transfer shift register HCCD extends in a row direction.

Figure 3:
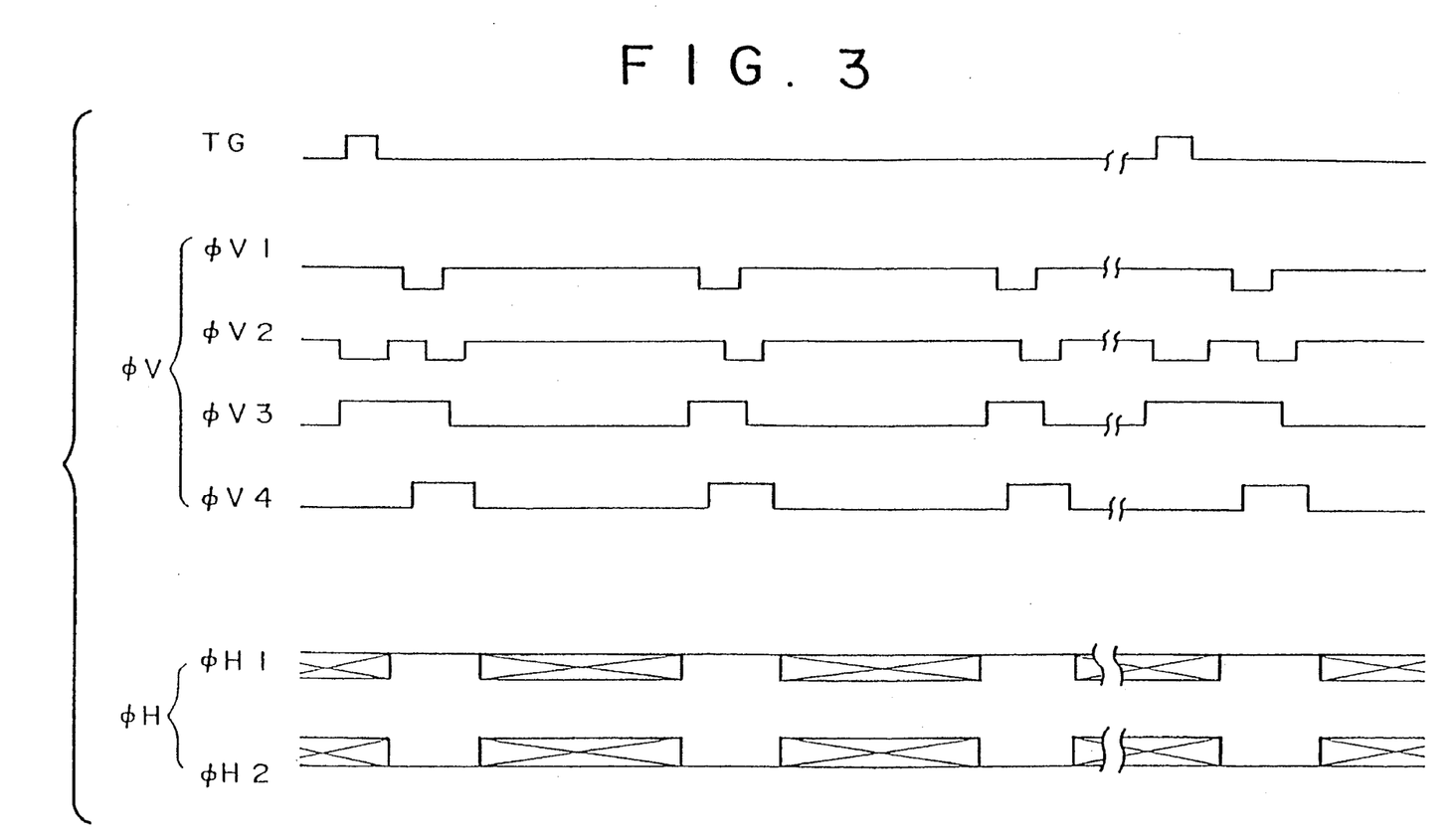
FIG. 3 is a timing diagram showing timing signals related to an operation of the CCD shown in FIG. 1.

The output of the photodiode PD (i.e., the electric charge generated by the photodiodes PD), is transmitted to the VCCD in accordance with a charge transfer signal TG (FIG. 3). Then, in accordance with a vertical drive signal $\phi V$ ($\phi V1-\phi V4$) (FIG. 3), a charge in the shift registers VCCD is transmitted to the shift register HCCD. The image data transferred to the shift register HCCD is transferred in the horizontal direction in accordance with a horizontal drive signal $\phi H$ ($\phi H1$, $\phi H2$) (FIG. 3), and outputted through an amplifier.

FIG. 3 is a timing chart showing the timing of the drive signals. When the charge transfer signal TG is HIGH, electric charge (image data) is transferred from the photodiodes PD (CCD pixels) to the shift registers VCCD. Then, one line of image data is transferred to the horizontal shift register HCCD, by applying the vertical drive signal $\phi V$ to the shift registers VCCD. Then, transfer of the charge in the shift register HCCD is performed in accordance with the horizontal drive signal $\phi H$. The drive signals are generated such that one line of image data is outputted synchronously with the vertical drive signal $\phi V$.

Figure 4:
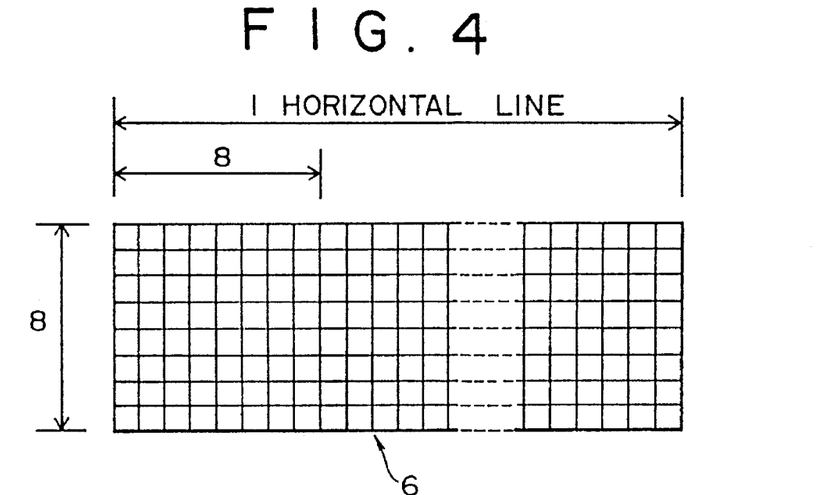
FIG. 4 shows a schematic map of a memory used in the CCD digital camera shown in FIG. 1.

FIG. 4 shows a schematic map of the memory 6. As described above, the memory 6 contains only a part of the image data outputted by the CCD 1. The capacity of the memory 6 is determined in accordance with the amount of image data (which is related to the number of the CCD pixels), which are compressed by the compression circuit 7, at one time. In this embodiment, the compression is performed for units of 8×8 pixels. The capacity of the memory 6 is determined as follows:

Memory capacity=N0×Ncmp where,

N0 is the number of pixels in one horizontal line of the CCD1,

Ncmp is the number of horizontal lines of the CCD 1 that are be compressed at one time.

Since the number of horizontal lines of pixels of the CCD 1 is about 500, and only 8 lines are compressed at a time, the size of the memory 6 is about 1/62 the size of the memory that would be required if all the data outputted by the CCD 1 was stored synchronously.

The compression circuit 7 compresses the image data in blocks of 8×8 pixels, thereby reducing the size of the data to be stored. The image data is first stored in the memory 6, and then read out as an 8×8 pixel matrix. The size of the compressed data is determined in accordance with the mode compression rate selected by the mode selection switch 15. In this embodiment, the size of the compressed data can be ¼, ⅛ or ¹⁄₁₆ the original size of the data.

When the compressed data is expanded, the microprocessor 14 detects the compression ratio of the data and determines the expansion ratio in accordance with the compression ratio so that the expanded data is expanded to its original size.

The drive signal generating section 11 generates the vertical drive signal φV and the horizontal drive signal φH. The gate circuit 12 periodically inhibits a predetermined number of the vertical drive signals φV from passing therethrough in accordance with an instruction outputted from the microprocessor 14. The number of vertical drive signals φV which are inhibited, depends on the compression ratio selected with the mode selection switch 15.

The drive signal generation section 15 also generates a timing signal which is synchronized with the vertical drive signal φV and the horizontal drive signal φH. The timing signal is transmitted to the display device 200 so that the display device 200 and the camera 100 process the signals synchronously.

Figure 5A:
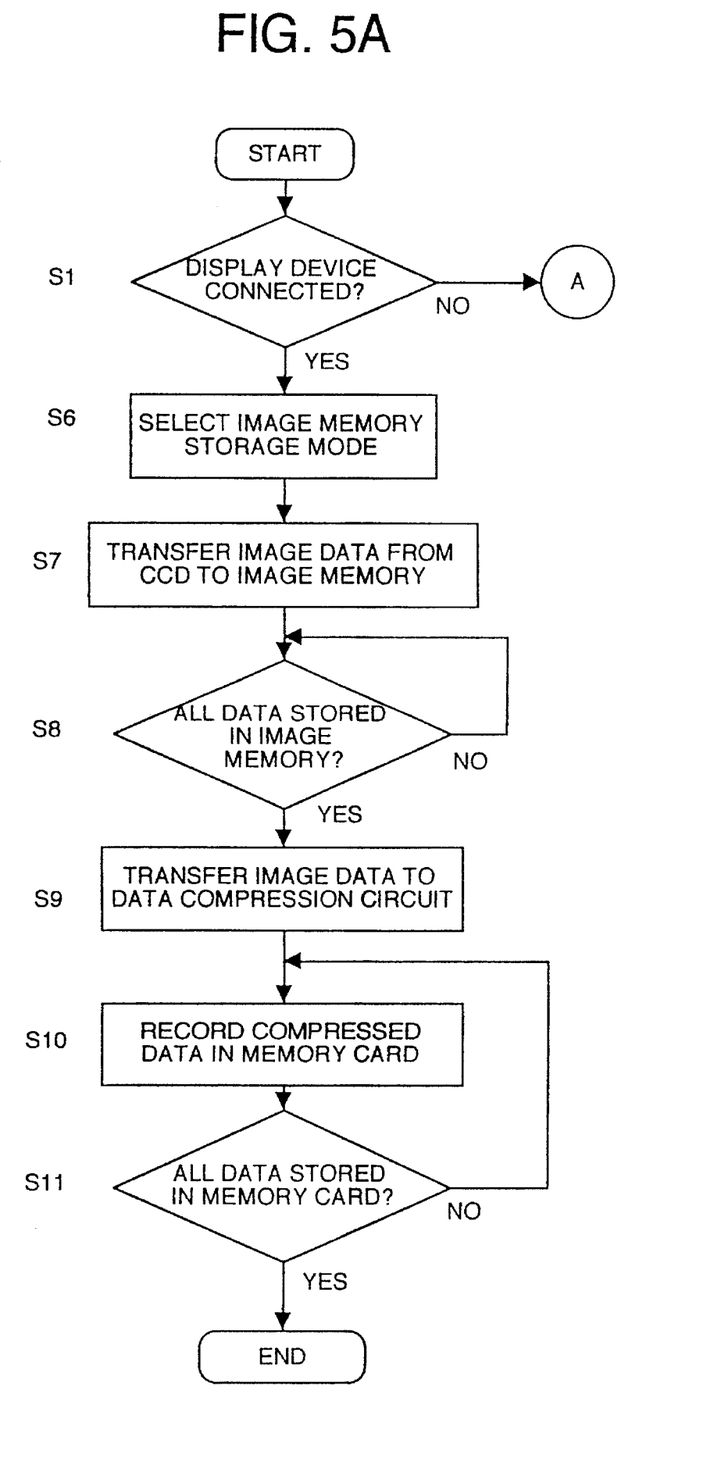
FIGS. 5A and 5B show a flowchart of an operation of the CCD digital camera system shown in FIG. 1.
Figure 5B:
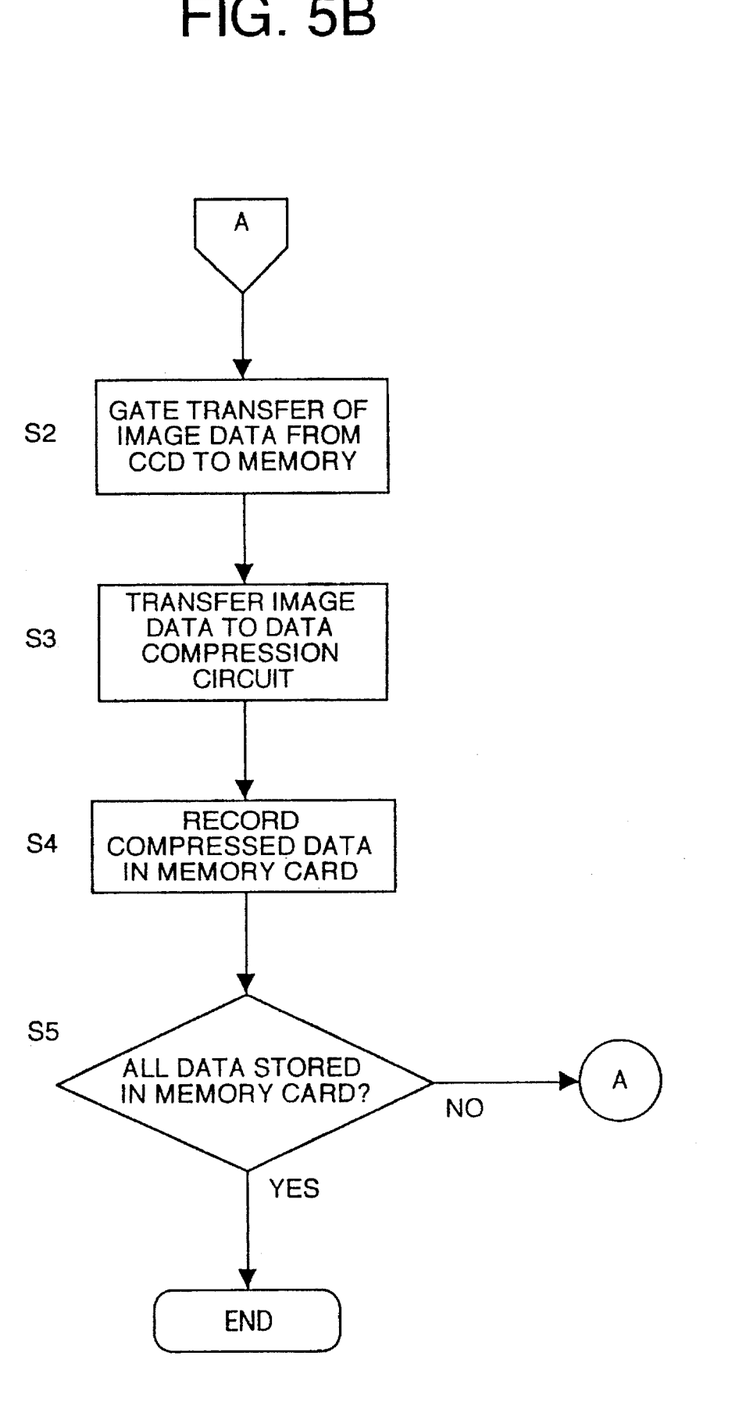

FIGS. 5A and 5B show a flowchart illustrating the operation of the CCD camera system.

When the recording switch 16 is depressed, the microprocessor 14 detects whether the display device 200 is connected to the camera 100, in step S1. In this embodiment, this detection is executed as described below.

One of the data pins of the microprocessor 26 is always grounded. Therefore, when microprocessor 26 and microprocessor 14 are connected through a data bus, one of the bus lines, which is connected to the grounded pin of the microprocessor 26, will be grounded. Thus, by monitoring for the grounded state of this bus line, the microprocessor 14 can determine whether it is connected to the microprocessor 26, and further, determine whether the display device 200 is connected to the camera 100. However, a mechanical sensor which detects the mechanical connection of the display device 200 with the camera 100 can also be used.

If the display device 200 is not connected to the camera 100 (S1:NO), the camera executes a normal recording operation (step S2) as described below with reference to FIG. 5B.

When the recording switch 16 is operated, the CCD 1 outputs image data corresponding to the image formed, by the optical system 2, on the surface of the CCD 1. The image data is transferred to the VCCD synchronously with the charge transfer signal TG generated by the drive signal generating section 11. In accordance with the horizontal and vertical drive signals φH and φV, the image data is transmitted from the CDS-A/D converter 3 to the DSP 4. The digital data is then gated through memory gate circuit 5 and temporarily stored in the memory 6. In step S3, the data stored in the memory 6 is subsequently read out in a predetermined block (as described above), and sent to the compression/expansion circuit 7, where it is compressed. In step S4, the compressed data is recorded on the memory card 10, through interface 8. This process is repeated until it is determined in step S5 that all the data has been recorded on the memory card 10.

In FIG. 5A, if the microprocessor 14 detects the connection of the display device 200 (S1:YES) when the recording switch 16 is activated, the image data is recorded using the image memory 21 of the display device 200.

The microprocessor 14 communicates with the microprocessor 26, with the microprocessor 26 setting a write mode (a mode that controls the image memory 21 so that it stores data) in step S6. Simultaneously, the gate circuit 12 allows every vertical driving signal φV to pass through. Thus, the image data output by the CCD 1 is transferred to the image memory 21 through the memory gate circuit 5, in step S7, without being stored in the memory 6. Since the image memory 21 can store data output by all the pixels of the CCD 1, the image data outputted by the CCD 1 is transmitted continuously to the image memory 21 until all the image data is stored in the image memory 21, as shown in step S8. Further, this direct method of storing the image data can be done in a relatively short period of time.

After all the image data is transmitted to the image memory 21, the microprocessor 14 controls the compression/expansion circuit 7 to operate in a compression mode, in step S9.

In accordance with the communication between the microprocessors 14 and 26, the image data stored in the image memory 21 is transmitted to the compression/expansion circuit 7 in predetermined data blocks. The image data compressed by the compression/expansion circuit 7 is recorded to the memory card 10, in step S10. This process is repeated, in step S11, until all the image data stored in the image memory 21 is compressed and recorded to the memory card 10.

While the image data stored in the image memory 21 is being recorded to the memory card 10, the image data is displayed on the display element 25, as described before. Thus, the photographed image can be immediately displayed after the photographing operation is finished.

The image data that has been recorded to the memory card 10 can be retrieved and displayed on the display device 200, as described below.

When the play button 17 is activated, the microprocessor 14 detects the compression ratio of the recorded image data. Then, the image data to be displayed is transmitted to the compression/expansion circuit 7 in predetermined data blocks. The image data is expanded at an expansion ratio which is determined in accordance with the compression ratio detected by the microprocessor 14, and then, the expanded image data is stored in the image memory 21, which has been set, by the microprocessor 26, to operate in the write mode. By repeating the above process, all the image data recorded to the memory card 10 is retrieved, and written in the image memory 21. When all the image data has been stored in the image memory 21, the microprocessor 14 controls the image memory 21 to operate in a read mode, whereby the stored image data is read from the image memory 21, and displayed on the display element 25, as described above.

As described above, the determination is made, in step S1, whether an external display device is connected to the camera. If there is no external display device connected, then the memory 6 in the camera 100 is used, and the data must be gated from the CCD 1 to the memory 6, before the data can be compressed and recorded.

The compression and recording operations take a relatively long period of time. More specifically, the recording operation (i.e., recording data to the memory card 10) takes 100–500 nsec per byte of data. During this recording period, the succeeding compression operation cannot be executed. In other words, the memory 6 is occupied by the image data being processed. If subsequent data is outputted by the CCD 1, the data cannot be stored in the memory 6. Thus, for a predetermined period, the microprocessor 14 inhibits the vertical drive signal φV from passing through the gate circuit 12 so that the signal is not transmitted to the CCD driver 13. Thus, during this period, the transfer of the image data in the shift registers VCCD does not occur.

When all the data stored in the memory 6 is compressed and recorded, the gate circuit 12 gates the vertical drive signal φV to the CCD driver 13. The subsequent data is transferred in the vertical direction in the shift registers VCCD, and in the horizontal direction in the shift register HCCD in accordance with the horizontal drive signal φH. The data is then transmitted to the memory 6, and subsequently compressed and recorded (shown in step S4 of FIG. 5B), as described above.

The above process is repeated until all the image data has been compressed and recorded (shown in step S5 of FIG. 5B).

In this embodiment, MOS shift registers VCCD are used, and therefore, the shift registers VCCD are capable of holding the accumulated charge (the image data) while the above operation is being performed.

Figure 6:
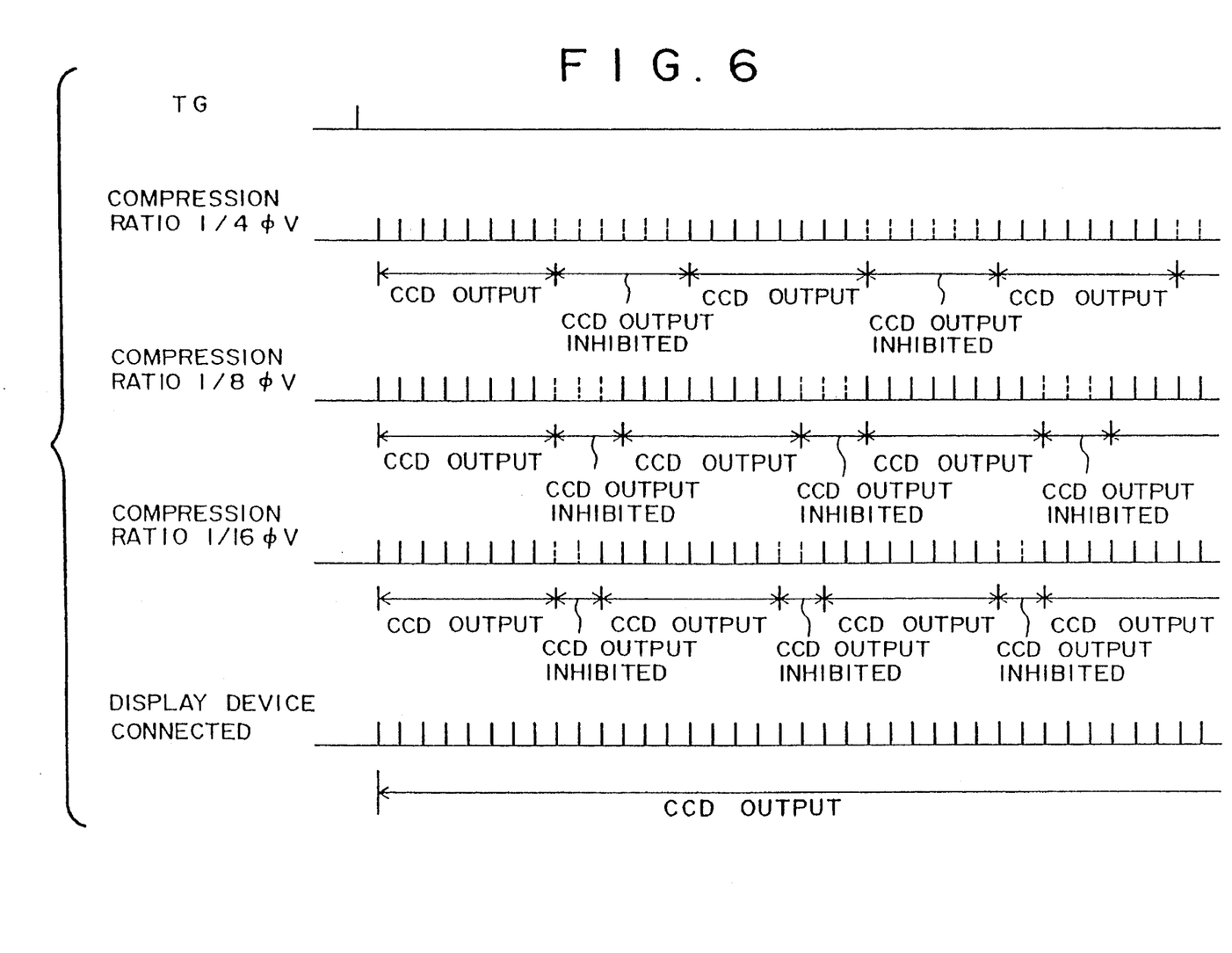
FIG. 6 shows a diagram illustrating an allowance/inhibition of a transmission of a vertical drive signal of the CCD shown in FIG. 1.

FIG. 6 illustrates an allowance/inhibition of transmission of the vertical drive signal φV in the gate circuit 12. As shown in FIG. 6, the charge transfer signal TG is output after the recording switch 16 is depressed, resulting in the CCD 1 accumulating charge corresponding to the object image. As described above, the charge accumulated on each photodiode PD is transferred to its respective shift registers VCCD when the charge transfer signal TG is generated.

Depending on the compression ratio selected, the microprocessor 14 controls the gate circuit 12 to regulate the number of vertical drive signals φV sent to the CCD driver 13.

If the compression ratio is ¼, the microprocessor 14 regulates the gate circuit 12 to allow eight vertical drive signals φV to be inputted to the CCD driver 13 so that eight lines of image data is outputted from the CCD 1. The image data is stored in memory 6. The gate section 12 then inhibits the next six vertical drive signals φV from being inputted to the CCD driver 13. The six vertical drive signals φV are made invalid. Then, the final horizontal drive pulse φH is output, which transfers the last row of data stored in the shift registers to the CDS A/D. This occurs before the first vertical drive signal is made invalid. Thereafter, no more data is transferred to the horizontal shift register HCCD (and therefore, out of the CCD 1) during the period that the vertical drive signals are made invalid. This allows the compression and recording of the image data, stored in memory 6, to be carried out during this period.

Further, as shown in FIG. 6, if the compression ratio is ⅛, then three vertical drive signals φV are inhibited from being sent to the CCD driver 13. If the compression ratio is ¹⁄₁₆, then two vertical drive signals φV are inhibited from being sent to the CCD driver 13. The number of invalid vertical drive signals is calculated as follows:

First, a gate period tg during which the gate circuit 12 inhibits the vertical drive signals φV from being sent to the CCD driver 13 is calculated by the equation $$tg = m \cdot P \cdot L \cdot tc \cdot n \quad (1)$$

where m is a coefficient intrinsic to a construction of the system;

P is the number of pixels on one horizontal line of the CCD;

tc is a time required to record one byte of data;

L is the number of rows of a matrix of pixels to be compressed at one time; and n is the compression ratio.

Then, a number of invalid vertical drive signals N, which is the quotient of tg/th rounded up to the next highest integer value is determined, where th is a horizontal scanning period (64 sec for an NTSC signal) of the CCD 1. For example, a CCD having 380,000 elements will be illustrated below.

P=768

L=8 (compression is executed for each 8×8 matrix)

m=1.5 (m=2 if the color difference signals are synchronized in phase when the Y signal and a color difference line sequential signal are compressed).

from the above, the gate period tg is $$tg = 1.5 \times 768 \times 8 \times n \times tc = 9216\ n \times tc$$

If tc=140 nsec, gate periods tg4, tg8 and tg16 corresponding to the compression ratios of ¼, ⅛ and ¹⁄₁₆, respectively, are calculated as follows.

If n=¼, $$tg4 = 322.56\ \mu sec,\ N > 322.56/64 = 5.04$$

therefore N=6

If n=⅛, $$tg8 = 161.28\ \mu sec,\ N > 161.28/64 = 2.53$$

therefore N=3

If n=¹⁄₁₆, $$tg16 = 80.64\ \mu sec,\ N > 80.64/64 = 1.26$$

therefore N=2

When the display device 200 is connected to the camera 100, the CCD output is uninterrupted, since there is sufficient memory to store all the data output by the CCD 1, before the data is compressed and recorded.

As described above, according to the present invention, the camera 100 can compress and record the image data without using an external device or memory. However, if the display device 200 is connected to the camera 100, the image memory, which is relatively large, can be used to store the image data before the image data is compressed and recorded. In other words, if an external device having a relatively large memory for storing data to be displayed, is connected to the camera 100, the camera 100 can use the larger extra memory during the recording process. If the larger extra memory is used for recording, the image data obtained by the CCD can be quickly transferred to the memory and recorded, thereby improving the speed of the camera system. Further, no image information is lost as a result of compressing the data. Thus the image quality is maintained.

Since the system according to the present invention requires an external device as well as the camera, the price of the system increases. However, in the system according to the present invention, the image memory is used not only for storing the data to be displayed, but also for storing the data to be recorded.

Since the camera of the system according to the present invention does not have an image memory which stores a frame of an image, but is still capable of compressing and recording the image data without this type of image memory, the manufacturing cost as well as the size of the camera can be decreased. Further, the display device of the system according to the present invention has an image memory, which can be used not only for displaying the image, but also for recording the image. Therefore, the functionality of the entire system is improved, since the image can be displayed as it is photographed, and the time required to store the data on the storage medium can be reduced.

What is claimed is:

1. A CCD digital camera system including a digital camera and a detachable display device, said digital camera comprising:

an imaging device for receiving an image of an object to be photographed, said imaging device outputting a digital signal corresponding to said received image;

a data memory for storing a portion of said digital signal; and a controller for controlling a transfer of a first portion of said digital signal from said imaging device to said data memory, said display device comprising:

an image memory for storing image data; and a display for displaying an image corresponding to said image data stored in said image memory, said controller monitoring an input from said display device for a predetermined signal indicating that said display device is attached to said digital camera, said controller transferring all of said digital signal to said image memory if a presence of said predetermined signal is detected; and said digital camera further comprising a compression unit for compressing said digital signal, said compression unit receiving said digital signal from said image memory if said controller detects said predetermined signal.

2. The CCD digital camera system according to claim 1, said compression unit receiving said digital signal from said data memory if said controller of said digital camera fails to detect said predetermined signal.

3. The CCD digital camera system according to claim 1, wherein said compression unit receives said digital signal from said data memory if said controller of said digital camera fails to detect said predetermined signal.

4. The CCD digital camera system according to claim 1, said digital signal being also supplied to said display device to display said image.

5. The CCD digital camera system according to claim 1, said digital camera further comprising a storage device, said compression unit outputting a compressed signal having a predetermined compression ratio, said compressed signal being stored in said storage device.

6. The CCD digital camera system according to claim 5, said digital camera further comprising an expansion unit, said compressed signal stored in said storage device being read out of said storage device and expanded at an expansion ratio determined in accordance with said compression ratio when a reproducing mode is selected.

7. The CCD digital camera system according to claim 1, said imaging device comprising:

a data processing unit; and a CCD, said CCD comprising:

a matrix of photoelectric detectors, each of said photoelectric detectors outputting an electrical signal corresponding to light from said received image;

a plurality of column shift registers, each of said plurality of column shift registers having a plurality of column registers, each of said plurality of column registers being connected to a corresponding one of said photoelectric detectors aligned in a single column of said matrix, each of said plurality of column registers storing a charge corresponding to said electrical signal output by said photoelectric detectors; and a row shift register having a plurality of row registers, each of said row registers being connected to an output of a corresponding one of said column shift registers, said controller controlling said plurality of column shift registers to shift said charge to said corresponding row registers, and said controller controlling said row shift register to transfer said charge to said data processing unit, said data processing unit outputting said digital signal to said image memory if said predetermined signal is detected.

8. The CCD digital camera system according to claim 7, said controller controlling said row shift register to transfer said charge to said data processing unit, said data processing unit outputting said digital signal to said data memory if said predetermined signal is not detected.

9. The CCD digital camera system according to claim 8, said controller controlling said column shift registers and said row shift register to transfer a predetermined number of charges from said column registers to said data processing unit, said predetermined number of charges corresponding to a first portion of said digital signal stored in said memory.

10. The CCD digital camera system according to claim 9, said digital camera further comprising a compression unit for compressing said digital signal, said compression unit outputting a compressed signal, and said first portion of said digital signal being transferred to said compression unit in a plurality of data blocks, each of said plurality of data blocks corresponding to a second portion of said digital signal, said second portion of said digital signal being a portion of said first portion of said digital signal.

11. The CCD digital camera system according to claim 10, said controller outputting vertical drive pulses for shifting said charge stored in said column shift registers to an adjacent register.

12. The CCD digital camera system according to claim 11, said digital camera further comprising a storage device for storing said compressed signal, said controller inhibiting an output of said vertical drive pulses until all of said first portion of said digital signal has been stored in said storage device.

13. A method of storing an image of an object photographed using a CCD digital camera system, the CCD digital camera system comprising a digital camera and a detachable display device, the method comprising:

converting an optical image of an object to be photographed into a digital signal;

detecting a presence of a predetermined signal, the predetermined signal being present if the display device is attached to the digital camera;

storing the digital signal in an image memory contained within the display device if a presence of the predetermined signal is detected;

storing the digital signal in a data memory contained within the digital camera if the presence of the predetermined signal is not detected;

compressing said image signal stored in said image memory if said presence of said predetermined signal is detected; and outputting said compressed image signal to a storage device.

14. The method of storing an image according to claim 13, further comprising the steps of:

compressing the image signal stored in the data memory if the presence of the predetermined signal is not detected; and outputting the compressed image signal to a storage device.

15. A CCD digital camera system including a digital camera and a detachable display device, said display device comprising:

an image memory for storing image data; and a display for displaying an image corresponding to said image data stored in said image memory, said digital camera comprising:

an imaging device for receiving an image of an object to be photographed, said imaging device outputting a digital signal corresponding to said received image; and a controller, said controller monitoring an input for a predetermined signal indicating that said display device is attached to said digital camera, said controller storing said digital signal in said image memory of said display device when a presence of said predetermined signal is detected;

said digital camera comprising a signal processing unit, said predetermined signal stored in said memory being read out of said memory and processed by said signal processing unit when said controller detects said presence of said predetermined signal.

16. The CCD camera system according to claim 15, said digital camera further comprising a storage device, said signal processing unit compressing said predetermined signal, said compressed predetermined signal being stored in said storage device.

* * * * *

UNITED STATES PATENT AND TRADEMARK OFFICE
CERTIFICATE OF CORRECTION

PATENT NO. : 5,534,921
DATED : July 9, 1996
INVENTOR(S) : K. SAWANOBORI

It is certified that error appears in the above-indentified patent and that said Letters Patent is hereby corrected as shown below:

On the cover, in section [56], "References Cited", "U.S. PATENT DOCUMENTS", insert ---5,231,501 7/1993 Sakai 348/231---.

On the cover, in section [56], "References Cited", "U.S. PATENT DOCUMENTS", insert ---5,282,041 1/1994 Tani et al. 348/299---.

On the cover, in section [56], "References Cited", "U.S. PATENT DOCUMENTS", insert ---5,359,427 10/1994 Sato 358/225---.

Signed and Sealed this

Fourteenth Day of January, 1997

Attest:

BRUCE LEHMAN

*Attesting Officer*     *Commissioner of Patents and Trademarks*